Patented May 4, 1948

2,440,743

UNITED STATES PATENT OFFICE 2,440,743

PROMOTED ACID TREATED CLAY CATALYST AND PREPARATION THEREOF

Wright W. Gary, Los Angeles, Calif., assignor to Filtrol Corporation, Los Angeles, Calif., a corporation of Delaware No Drawing. Application July 3, 1943, Serial No. 493,488

10 Claims. (Cl. 252—205)

This invention relates to a process for the production of catalyst of high catalytic activity, and particularly an activated clay catalyst useful in catalytic conversion of hydrocarbon such as catalytic cracking.

Acid-treated clays such as the acid-activated sub-bentonites of the montmorillonite family are well known as cracking catalysts. These activated clays are employed in granular form in the so-called fluid catalyst process and in pellet form in the so-called moving-bed and fixed-bed types of catalyst processes.

These acid-treated sub-bentonite clays are produced by acid treatment of the sub-bentonites whereby part of their alumina content is extracted. For instance, the clay may be treated with about from 20 to 250 pounds of sulfuric acid per hundred pounds of clay, both calculated as moisture free, employing the acid in concentration from 5% to 50%. The extracted clays have an alumina content of from 10% to 20%, usually about 15% to 18%.

For example, a typical native sub-bentonite clay employed in the manufacture of acid-treated catalyst has the following composition:

The native clay will have from 30% to 45% moisture content. When treated with 45 pounds of sulfuric acid (calculated as anhydrous) based on 100 pounds of clay (calculated as volatile free, i. e., free of moisture), employing the acid in concentration of about 15% (based on the total water content of the mix), a clay of the following composition (on a volatile free basis) is obtained:

| | Per cent |
|---|---|
| $Al_2O_3$ | 17.95 |
| $Fe_2O_3$ | 1.13 |
| CaO | 1.82 |
| MgO | 3.9 |

The remaining material is substantially all $SiO_2$. This clay will be hereinafter referred to in the following examples as clay No. 1.

When the same native clay is treated with 60 pounds of acid (calculated as anhydrous $H_2SO_4$) per hundred pounds of volatile free clay, using a 12% acid concentration (based on the total water content of the mix) for a period of six hours, I obtain a clay having the following composition:

| | Per cent |
|---|---|
| $Al_2O_3$ | 14.77 |
| $Fe_2O_3$ | .95 |
| CaO | 1.67 |
| MgO | 2.37 |

The remaining portion is substantially all $SiO_2$. This clay will be referred to in the following examples as clay No. 2.

It is usual to dry such clays to a moisture content of about 10% to 20%.

Such clays have a relatively high catalytic activity. For instance, the clay may be pelleted by mixing the clay with water to a content of about 45% to 48% and extruding the moistened clay in a screw-type extruder through a die to form extruded pellets. Such pelleted catalyst after drying to about 10% to 20% V. M. has a high catalytic activity when used in the cracking of oil. The term "% V. M." or "per cent volatile matter" represents the per cent of moisture evaporated from the clay when the grains of the clay are heated in a 20 cc. crucible to 1800° F. for thirty minutes.

I have discovered that this catalytic activity may be enhanced by impregnating the clay with a manganous salt solution. The dried acid-treated clay may be mixed with a dilute manganous salt solution and the impregnated clay separated from the excess water to bring the clay back to the desired moisture content of about 10% to 20%. This impregnation may conveniently be made by employing the salt solution as the added moisture employed in pelleting the clay, or if the clay is to be used in the un-pelleted form, the clay, either before or after drying, may be impregnated with the manganous salt solution.

For example, the acid-treated clay is washed substantially free of acid, although some residual acidity is not necessarily detrimental, and is filtered. The clay cake is dried to a moisture content of about 20%. The dried clay may be stored and run through the impregnation process as desired. The clay is mixed with a manganous salt solution in an amount to give a salt dosage from about .05 to 5%, depending on the nature of the clay when calculated as MnO based on the volatile free clay. The promoter should be used in an optimum amount to give an impregnation efficiency in excess of 100% as defined herein. When used in excess it may actually decrease the activity of the catalyst. This optimum amount and this excessive amount depend as well on the nature of the clay and the degree of acid treatment as on the nature of the added manganous salt. I prefer to use less than about 1% and have found advantageous results in employing about .05% to .2%, more or less, when employing acid-treated sub-bentonites treated to give from about 10 to 20% of $Al_2O_3$ plus $Fe_2O_3$ in the acid-treated volatile free clay. I employ the metal in the form of a water soluble salt such as manganous sulfate or nitrate. Other soluble salts may be employed. The salt solution is employed in quantity sufficient to raise the moisture content of the clay to that necessary for good pelleting operation, i. e., about 40% to 50%. The clay and added salt solution are intimately mixed and extruded in the pelleting machine and the pellets dried to about 10% to 20% moisture content. In order to determine the catalytic efficiency of the catalyst in the cracking of petroleum oil, the catalyst is tested in the following manner:

The dried catalyst pellet is introduced into an oven maintained at 1050° F. and the pellet maintained at this temperature for a period of five hours. The catalyst is then cooled without access to air in a desiccator or similar container and upon cooling is transferred to air-tight containers.

200 cc. of the catalyst (i. e., sufficient catalyst to occupy 200 cc.) are then transferred into the cracking chamber of the cracking catalyst unit. The catalyst is raised to 800° F. and a vaporized gas-oil (35.5–37.5 A. P. I. East Texas gas-oil having 700–730° end point) is passed through the unit at a rate of 30 liters of liquid oil per hour per 20 liters of catalyst. The exiting vapors from the cracking chamber are condensed at a temperature of 60° F. The condensate thus collected is termed the first-cycle condensate.

At the end of 10 minutes the cracking is discontinued and the catalyst is regenerated by raising its temperature to 900° F. and passing air through the catalyst to convert the deposited carbon into CO and $CO_2$. The passage of air is continued until no substantial amounts of carbon monoxide or carbon dioxide are present in the exiting gases.

The air flow is then discontinued and the temperature of the catalyst is reduced to 800° F. and a second cycle of 10 minutes is carried out in the manner previously described. Repeated cycles of regeneration and cracking are carried out.

The condensates collected in the manner previously described are distilled in an Engler distillation unit whose condenser temperature is maintained at 60° F. to determine the content of 410° F. end-point gasoline in the synthetic crude. It will be observed that this gasoline does not represent the entire yield of such gasoline produced in the process, since it does not include the gasoline fractions lost with the gases removed from the cracking unit, nor does it include the gasoline fractions lost in the Engler distillation. However, for the purpose of comparing the activity of catalysts, the per cent of such 410° F. end-point gasoline thus determined for cycles other than the first cycle may be taken to be an index of the activity of the catalysts.

In the following examples I will take the per cent yield of 410° F. end-point gasoline as determined by the above procedure produced in the second and following cycles as 100%. I evaluate the efficiency of the impregnation by comparing the yield thus obtained for clays impregnated according to the invention of this application with the yield obtained in following the same procedure employing the same acid-treated clay impregnated with the various compounds. The formula employed will therefore be:

Efficiency of impregnation =
$$100\% \times \frac{\text{Yield on employing impregnated clay}}{\text{Yield on employing unimpregnated clay}}$$

*Example 1*

Four pounds of No. 1 clay of 22.1% volatile matter acid-treated are mixed with 900 cc. of water in which have been dissolved 4.45 grams of $MnSO_4.4H_2O$. The wetted clay was mixed to insure uniform distribution of the moisture and extruded to give cylindrical pellets of $\frac{1}{16}''$ in diameter and $\frac{1}{16}''$ long. This is equivalent to 0.1% MnO based on volatile free clay. The pellets were dried to obtain a pellet of 15.3% V. M. The efficiency of impregnation was 118%.

*Example 2*

Three pounds of No. 2 clay of 20.9% volatile matter content are mixed with 750 cc. of water containing 3.39 grams of $MnSO_4.4H_2O$. The mixture is then extruded in the manner previously described. The extruded pellet is then dried to 10% V. M. The impregnated pellet contained manganous salt equivalent to 0.1% MnO based on the volatile free clay. The efficiency of impregnation was 115%.

*Example 3*

Four pounds of No. 1 clay having a volatile matter content of 21.9% were mixed with 7.15 grams of a 50% $Mn(NO_3)_2$ solution made up to 900 cc. with water. This mixture was pelleted in the above manner. The pellet was dried to a moisture content of 12.5% V. M. This corresponds to a manganous salt content equivalent to 0.1% MnO based on volatile free clay. The efficiency of impregnation when tested by the above procedures equal to 115%.

Instead of pelleting the catalyst, the acid-treated clay, either before or after drying, may be mixed with salt solution of desired concentration to give salt impregnation equivalent to MnO, desired, for example, in the amounts stated above. The filtered clay, after removal of excess water, may then be dried and ground to size.

While I have described a particular embodiment of my invention for the purpose of illustration, it should be understood that various modifications and adaptations thereof may be made within the spirit of the invention as set forth in the appended claims.

I claim:

1. A promoted acid-treated montmorillonite clay catalyst consisting essentially of acid-treated montmorillonite clay and a water soluble manganous salt in amount from 0.05 to 5% calculated as MnO based on the clay calculated as volatile free.

2. A promoted acid-treated montmorillonite clay catalyst consisting essentially of acid-treated montmorillonite clay and manganous sulfate in amount from 0.05 to 5% calculated as MnO based on the clay calculated as volatile free.

3. A promoted acid-treated montmorillonite catalyst consisting essentially of acid-treated montmorillonite clay and manganous nitrate in amount when calculated as MnO equal to from 0.05 to 5% based on the clay calculated as volatile free.

4. A promoted acid-treated montmorillonite clay in pellet form consisting essentially of acid-treated montmorillonite clay and water soluble manganous salt in amount when calculated as MnO equal to from 0.05 to 5% based on the clay calculated as volatile free.

5. A promoted acid-treated montmorillonite clay in pellet form consisting essentially of acid-treated montmorillonite clay and manganous sulfate in amount when calculated as MnO equal to from 0.05 to 5% based on the clay calculated as volatile free.

6. A promoted acid-treated montmorillonite clay in pellet form consisting essentially of acid-treated montmorillonite clay and manganous nitrate in amount when calculated as MnO equal to from 0.05 to 5% based on the clay calculated as volatile free.

7. A method for forming pelleted acid-treated clay catalyst, which comprises mixing relatively dry acid-treated clay with a water solution in amount sufficient to render said clay extrudable of a manganous salt in amount when calculated as MnO equal to from 0.05 to 5% based on the clay calculated as volatile free, and forming the pellet from said mixture.

8. A method for forming pelleted acid-treated clay catalyst, which comprises mixing relatively dry acid-treated clay with a water solution in amount sufficient to render said clay extrudable of manganous sulfate in amount when calculated as MnO equal to from 0.05 to 5% based on the clay calculated as volatile free, and forming the pellet from said mixture.

9. A method for forming pelleted acid-treated clay catalyst, which comprises mixing relatively dry acid-treated clay with a water solution in amount sufficient to render said clay extrudable of manganous nitrate in amount when calculated as MnO equal to from 0.05 to 5% based on the clay calculated as volatile free, and forming the pellet from said mixture.

10. A method for forming acid-treated clay catalyst, which comprises mixing relatively dry acid-treated clay with water in amount sufficient to render said clay extrudable carrying a manganous compound in solution in amount when calculated as MnO equal to from 0.05 to 5% based on the clay calculated as volatile free, and forming the pellet from said mixture.

WRIGHT W. GARY.

REFERENCES CITED

The following references are of record in the file of this patent:

UNITED STATES PATENTS

| Number | Name | Date |
| --- | --- | --- |
| 1,696,644 | Patrick | Dec. 25, 1928 |
| 1,764,024 | John et al. | June 17, 1930 |
| 1,797,426 | Larson | Mar. 24, 1931 |
| 1,837,971 | Joseph | Dec. 22, 1931 |
| 2,078,945 | Houdry | May 4, 1937 |
| 2,215,305 | Voorhies | Sept. 17, 1940 |
| 2,268,110 | Connolly | Dec. 30, 1941 |
| 2,278,677 | Stahley et al. | Apr. 7, 1942 |
| 2,330,098 | Watts | Sept. 21, 1943 |

OTHER REFERENCES

Mellor: Comprehensive Treatise on Inorganic and Theoretical Chemistry, Longmans, vol. 12, page 444.